United States Patent [19]

Loigerot

[11] 3,967,663
[45] July 6, 1976

[54] STRIPING DEVICE

[75] Inventor: Jean Loigerot, Paris, France

[73] Assignee: Association pour la Rationalisation et la Mechanisation de l'Exploitation Forestiere, Paris, France

[22] Filed: Oct. 21, 1974

[21] Appl. No.: 516,180

[30] Foreign Application Priority Data
Oct. 22, 1973  France .............................. 73.37631

[52] U.S. Cl. .............................. 144/2 Z; 144/208 J
[51] Int. Cl.² ........................................ A01G 23/08
[58] Field of Search ............... 144/2 Z, 3 D, 34 R, 144/309 AC, 208 R, 208 J, 218

[56] References Cited
UNITED STATES PATENTS

| 1,283,070 | 10/1918 | Callender ..................... 144/208 J X |
| 3,252,487 | 5/1966 | Larson et al. ...................... 144/2 Z |
| 3,556,181 | 1/1971 | Jouppi .................................. 144/2 Z |
| 3,672,413 | 6/1972 | Jouppi .................................. 144/2 Z |
| 3,717,185 | 2/1973 | Moser .................................. 144/2 Z |

FOREIGN PATENTS OR APPLICATIONS 224,189    1968    U.S.S.R. ............................ 144/2 Z

Primary Examiner—Othell M. Simpson
Assistant Examiner—W. D. Bray
Attorney, Agent, or Firm—Wolf, Greenfield & Sacks

[57] ABSTRACT

A delimbing device for stripping branches from tree trunks includes a cutting chain which is wrapped about the tree trunk in a helical configuration. The articulated links of the chain include cutting edges which are disposed in helical configuration about the tree trunk so that when the trunk is advanced axially with respect to and through the helical chain, the limbs will be stripped from the trunk.

7 Claims, 8 Drawing Figures

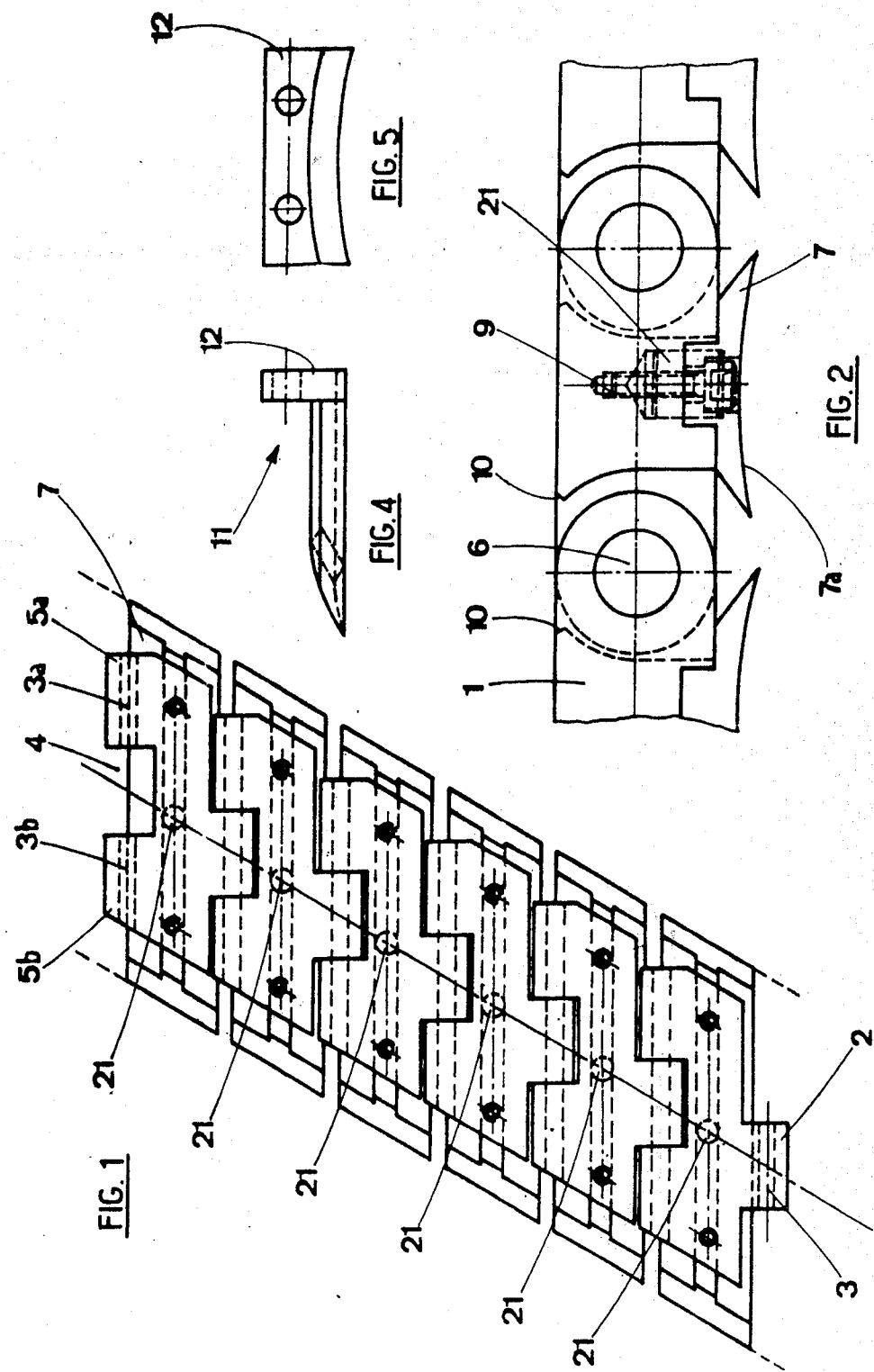

STRIPING DEVICE

BACKGROUND AND SUMMARY OF THE INVENTION

This invention relates to an improved tree harvesting device and, particularly, to an improved arrangement for cutting branches and limbs from tree trunks. While a number of devices have been employed for this purpose, their use has not been without difficulty. For example, the typical type of device employs a chain-like member which is wrapped about the tree trunk and then the trunk is moved axially through the chain to sever the limbs and branches.

One of the difficulties which often is encountered results from the tendency of trees to grow a plurality of branches or limbs at the same location along the length of the trunk in a "crown-like" array. With the typical prior devices, the cutting chain is arranged so that it will engage all of the branches at a particular location along the length of the trunk at or about the same time. This necessitates the use of extremely heavy equipment in order to be able to cut the plurality of branches or limbs at or about substantially the same time. Also among the difficulties encountered with the prior devices is that many of them do not employ a single chain which entirely surrounds the tree to be stripped but, instead, includes a plurality of additional stripping devices, which results in a more complex, awkward and heavier type of equipment.

The above difficulties are overcome with the present invention which employs a single cutting chain formed from a plurality of articulated links, one end of the chain being pivoted to a frame and the other end of a pivoting arm which can be operated to wind or unwind the chain about the tree trunk. The chain is longer than the circumference of the tree trunk and is arranged so that when it is wrapped about the tree trunk, it will assume a helical configuration. To this end, the pivoting arm is located in longitudinally spaced relation to the connection of the first mentioned end of the chain to the frame. When the tree trunk is advanced axially through and with respect to the helically wound chain, the limbs or branches will be severed one at a time, even at a crown region of the trunk, where a plurality of limbs may extend outwardly from the same location on the trunk. Because the limbs are severed individually, substantially less power is required and the equipment need not be as heavy as has been the practice with the prior devices.

It is among the objects of the invention to provide an improved tree delimbing device.

A further object of the invention is to provide an improved limb stripping device employing an articulated chain which is wrapped about the tree trunk in a helical configuration and which extends more than 360° about the trunk.

Another object of the invention is to provide a delimbing device which can sever a plurality of limbs extending from the trunk in a crown-like configuration without requiring extraordinarily heavy equipment.

A further object of the invention is to provide a delimbing device of the type described in which, when the helically disposed chain is unwrapped, the articulated chain links are precluded from being unwrapped beyond a straight configuration.

Another object of the invention is to provide an improved delimbing chain formed from a plurality of articulated links connected to circumscribe the tree trunk helically, the articulated links each carrying a generally parallelogram-shaped cutting blade.

DESCRIPTION OF THE DRAWINGS

The foregoing and other objects and advantages of the invention will be understood more fully from the following further description thereof, with reference to the accompanying drawings wherein:

FIG. 1 is a diagrammatic illustration of an extended portion of the cutting chain;

FIG. 2 is a side elevation of a few of the chain links showing the cutting chain in detail;

FIG. 4 is a side elevation of a modified embodiment of the knife;

FIG. 5 is a front elevation of the modified embodiment of the knife shown in FIG. 4 as seen from the cutting edge thereof;

DESCRIPTION OF THE PREFERRED EMBODIMENT

Figure 7:
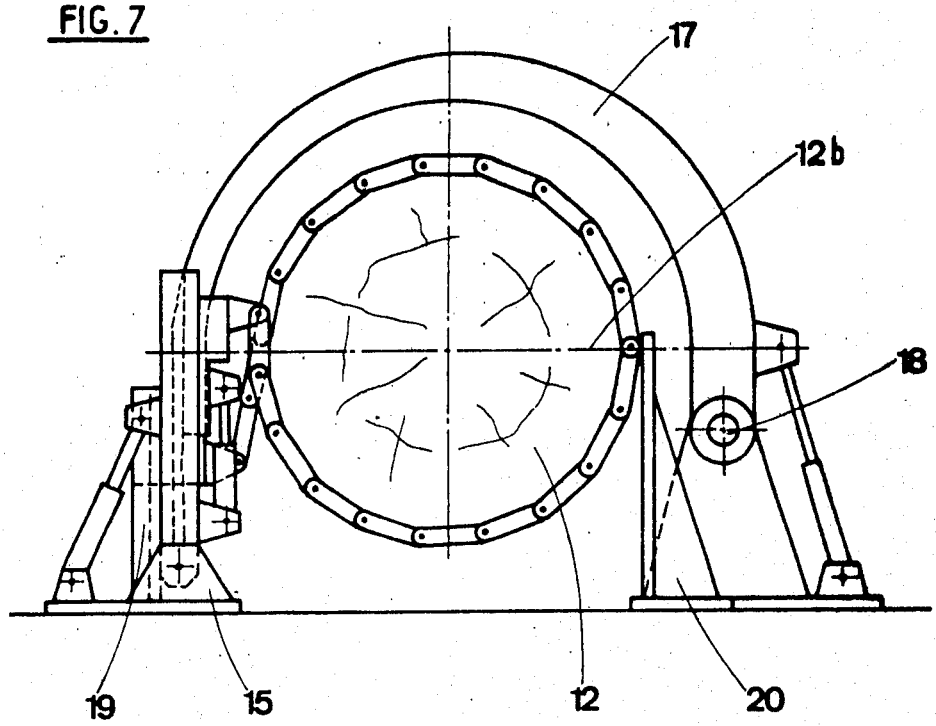
FIG. 7 is an illustration of the device wrapped about a tree trunk as seen along the axis of the trunk.

As shown in FIGS. 1 and 2, the cutting chain is formed from a plurality of articulated links 1. The links are of a configuration such that they may be inscribed within a parallelogram so that when they are connected, the assembly of links itself defines an elongate parallelogram. Each link has, on one of its longitudinal sides, a hinge element 2 having a bore 3 formed therethrough and, on its other longitudinal side, a receptive yoke 4 defined by a pair of longitudinally spaced hinge elements 5a, 5b. Each of the hinge elements 5a, 5b has a bore 3a, 3b formed longitudinally therethrough to enable the hinge elements 2, 5a, 5b to be hinged together by hinge pins 6.

Figure 3:
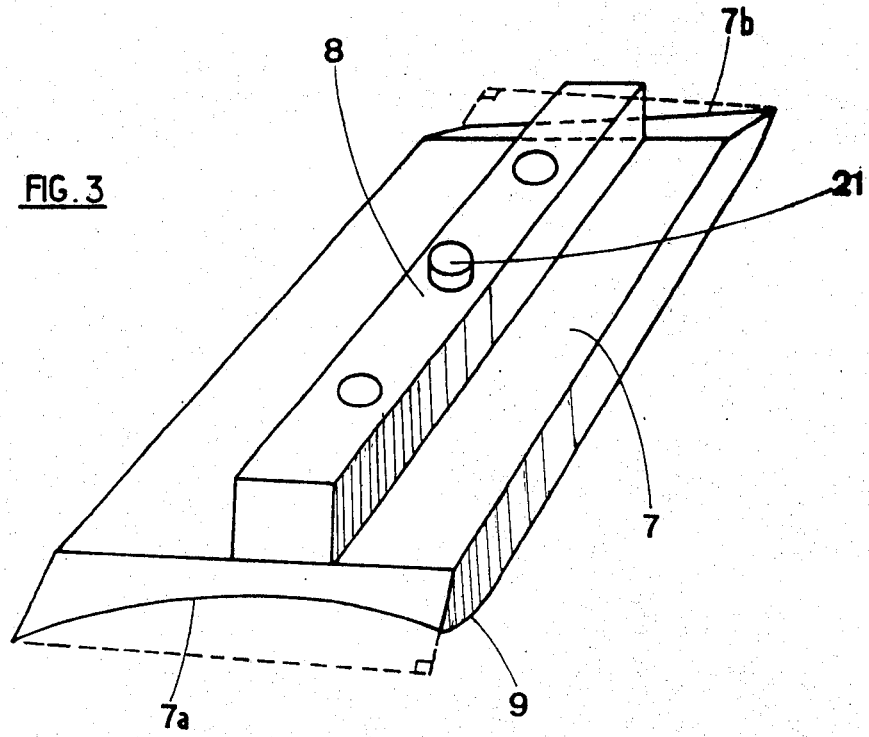
FIG. 3 is a perspective illustration of a knife itself.

Each link 1 carries a knife member 7 which can be detached from the link 1. In the embodiment shown in FIGS. 2 and 3 each of the knife members 7 is of generally parallelogram-shaped configuration having parallel longitudinal edges and parallel end cutting edges. Each knife member 7 includes a rib 8 which may also carry a stud 21. The rib 8 and stud 21 are received in a receptive mortise or groove and hole of complementary shape formed on each of the links 1. The knives are secured to the links 1 by screws 9. The stud 21 serves to preclude longitudinal shifting of the knife with respect to its link to insure that the screws 9 will not be damaged and to maintain the knife in proper position on its link 1 during use.

In the preferred embodiment of the invention, each of the opposite end edges of the knife member 7 is provided with cutting edges 7a, 7b which substantially parallel each other. This feature of the invention enhances its versatility in that it enables the tree trunk to be stripped of its limbs by advancing the trunk in either axial direction. Also, it enables the knife members 7 to be easily detached from their respective links 1 and be reversed to present the other, fresh cutting edge to the limbs of the tree. With this configuration, the frequency with which the cutting edges must be sharpened is reduced by half. Moreover, the construction employed does not require detachment of the chain links 1 from the device nor does it require disassembly of the links 1 from each other which facilitates maintenance.

It is preferred to form the underside surface of each of the knife members 7 to be of concave configuration so that when the chain is wrapped about the tree, the inner surfaces of the knife member 7 will define a generally cylindrical configuration and will enable the limbs to be shaved in close proximity to the trunk. As indicated at 9, the region of the underside of each of the knife members 7, in proximity to the cutting edges may be provided with an upwardly beveled region 9 to define a slight clearance between the cutting edge and the trunk to preclude the knife edges from penetrating the trunk itself.

The generally parallelogram-configuration of the links 1 and the parallelogram-configuration of the knife members 7 is such that the transverse cutting edges 7a, 7b of the knife members 7 define a substantially continuous helical cutting line which circumscribes the tree trunk.

Figure 6:
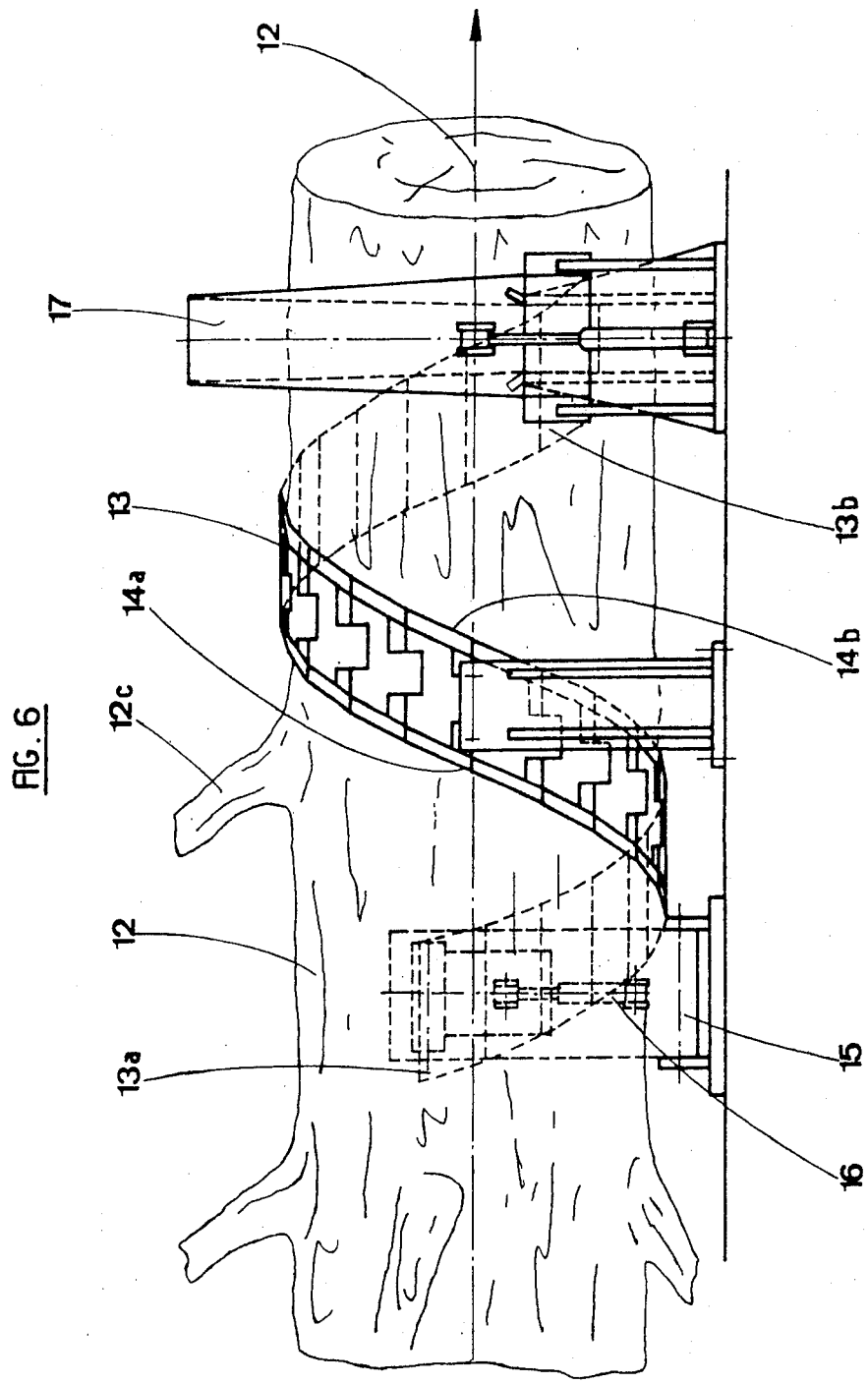
FIG. 6 is a side elevation of the device helically wrapped about a tree trunk.
Figure 8:
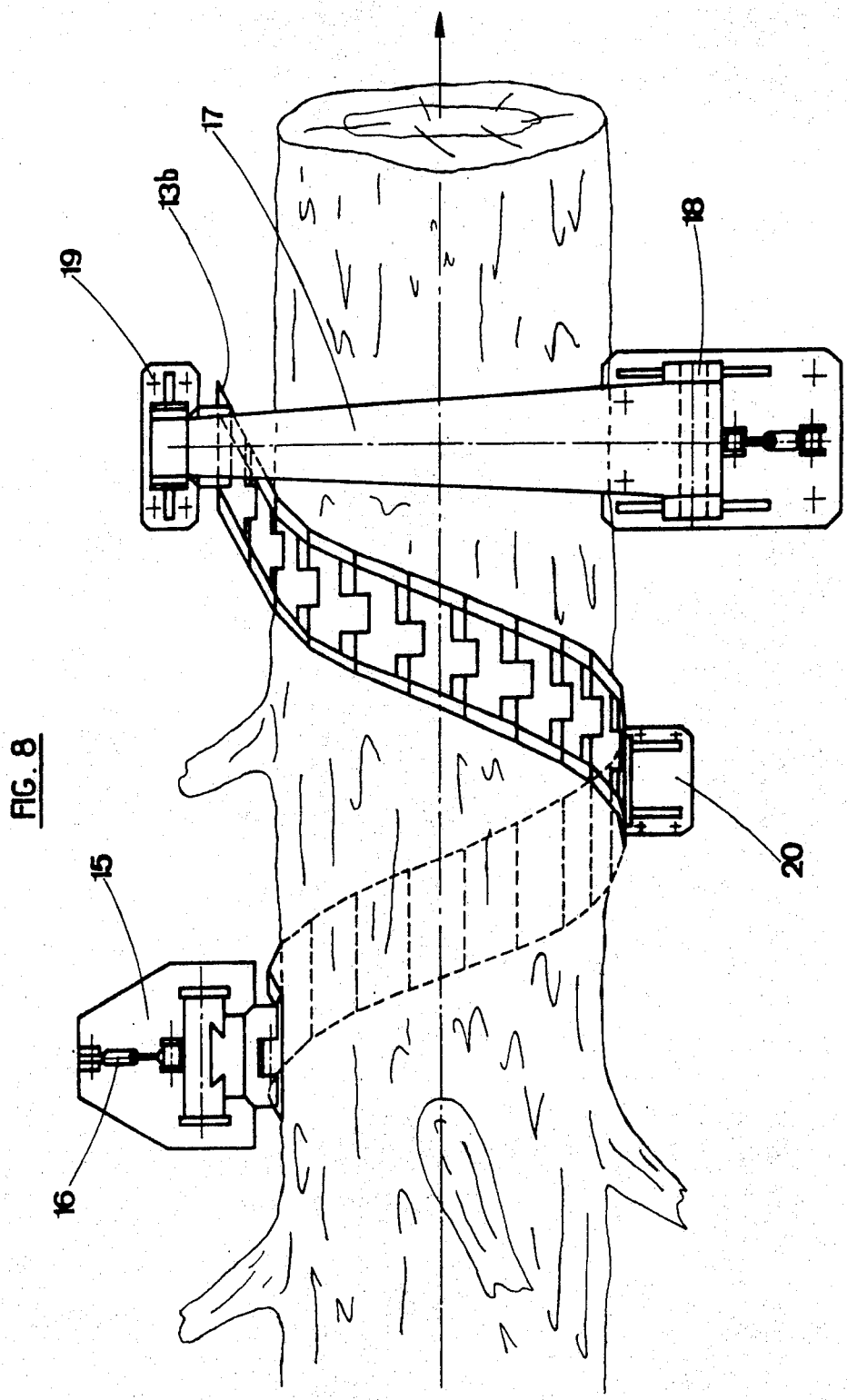
FIG. 8 is a plan view of the arrangement shown in FIG. 6.

The cutting chain is mounted to a frame which includes a stationary support 15 which pivotally supports one end of the chain. The stationary support member 15 includes an adjustment means 16 which enables the first end 13a of the chain 13 to be raised or lowered to permit adjustment of the device to accommodate trees of different diameters as well as when the same tree trunk is of varying diameter. The other end 13b of the chain 13 is connected to the end of an arcuate arm 17 which is pivoted to the frame at an axis 18 which parallels the general longitudinal axis of the tree trunk. The arm 17 is pivotable between an open position in which the chain is receptive to a tree trunk and a closed position (FIGS. 6 and 7) in which it causes the chain to be wrapped about the tree trunk. The arm 17, and particularly its outer end, where it is connected to the end 13b of the chain 13, is spaced longitudinally from the support 15. A stop 19 is provided in association with the arcuate arm 17 to limit the closing movement of the arm 17 and define its closed position. In the preferred embodiment, an intermediate support 20 is secured to the frame at a location longitudinally midway the support 15 and arm 17. The intermediate support 20 is connected to the chain 13 at the middle of the chain and provides a support for each of the half sections of the chain which extend from its midportion to the first end 13a and from the midportion to the second end 13b of the chain. When the arm 17 is swung to an open position, the lower half of the helical loop will remain in its trunk-receptive position while the upper half of the chain will be opened to receive a trunk. Opening of the chain in this manner also exposes all of the screws by which the cutting member 7 are secured to the links as described above.

It should be noted that it is desirable to preclude the links 1 from being pivoted beyond a straight line configuration when the chain is unwrapped from its trunk encircling configuration and, to this end, each link 1 is provided with an abutment shoulder cooperative with the adjacent portion of the adjacent link to preclude unfolding of the chain beyond a substantially straight-line configuration.

FIGS. 4 and 5 show an alternate configuration for the knie members which is square as suggested at 11 and which has an upwardly extending portion 12 by which the knife member 11 may be secured to a side face of the links by screws or bolts.

It should be understood that the foregoing description of the invention is intended merely to be illustrative thereof and that other embodiments and modifications may be apparent to those skilled in the art without departing from its spirit.

Having thus described the invention, what I desire to claim and secure by Letters Patent is:

1. A device for stripping the limbs from a tree trunk comprising:
   a frame;
   means for effecting advancement of a tree along its longitudinal axis with respect to said frame;
   an elongate cutting chain having two ends and being formed from a plurality of articulated links pivotally connected to each other, one end of said cutting chain being connected to said frame, said chain being constructed and arranged so that its opposite end is spaced longitudinally from said first mentioned end of said chain to enable said chain to be wrapped about said trunk in a continuous, helical configuration;
   a lever arm mounted to the frame and having a free end connected to said opposite end of the cutting chain, the lever arm being mounted for movement between positions in which it wraps and unwraps the chain helically about the trunk;
   the length of the chain being such as to enable it to be wrapped about the trunk more than 360°.

2. A device as defined in claim 1 further comprising: each link carrying a sharp cutting edge which extends in a generally helical direction paralleling the helical direction of the chain, each of said cutting edges being arranged to define a substantially continuous cutting edge which extends helically about the tree trunk when said chain is wrapped about said tree trunk.

3. A device as defined in claim 2 further comprising: each link having a knife member detachably connected thereto, said cutting edge being formed on said knife member.

4. A device as defined in claim 3 further comprising: each of said knife members being of substantially parallelogram configuration and having a second cutting edge on the opposite end thereof parallel to said first mentioned cutting edge, said knife members being mounted to said links so that each knife member may be mounted in its respective link to present either of said cutting edges to the direction from which the trunk is advanced.

5. A device as defined in claim 3 further comprising: each of said knife members having a concave bottom whereby when they are wrapped about the tree trunk, they will define a generally cylindrical surface.

6. A device as defined in claim 1 further comprising: abutment means formed on each pair of adjacent of the chain links, said abutment means being constructed and arranged as to preclude said links from being unwound beyond a generally straight configuration.

7. A device as defined in claim 1 further comprising: an intermediate support connected to the frame and being located between the ends of the chain, said intermediate support being secured to a link of said chain intermediate the ends of the chain whereby when the lever arm is moved to its open position, the portion of the chain between the intermediate support and the lever arm will be unwrapped from about the trunk and the portion of the chain extending from its first mentioned end thereof to the intermediate support will remain in a trunkreceptive configuration.

* * * * *